United States Patent
Lin et al.

(10) Patent No.: US 11,211,652 B2
(45) Date of Patent: Dec. 28, 2021

(54) PROTECTIVE DEVICE FOR CELL

(71) Applicant: Ningde Amperex Technology Limited, Fujian (CN)

(72) Inventors: Sen Lin, Fujian (CN); Peipei Guo, Fujian (CN); Ping He, Fujian (CN); Qingshan Wen, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 473 days.

(21) Appl. No.: 16/258,689

(22) Filed: Jan. 28, 2019

(65) Prior Publication Data
US 2020/0083576 A1 Mar. 12, 2020

(30) Foreign Application Priority Data
Sep. 6, 2018 (CN) .......................... 201821458106.6

(51) Int. Cl.
*H01M 10/637* (2014.01)
*H01M 10/44* (2006.01)
*H01M 10/42* (2006.01)
*H01M 50/581* (2021.01)

(52) U.S. Cl.
CPC ..... *H01M 10/637* (2015.04); *H01M 10/4257* (2013.01); *H01M 10/443* (2013.01); *H01M 50/581* (2021.01); *H01M 2200/10* (2013.01)

(58) Field of Classification Search
CPC .......... H01M 10/637; H01M 10/4257; H01M 10/443; H01M 50/581
See application file for complete search history.

(56) References Cited

U.S. PATENT DOCUMENTS

2017/0237060 A1* 8/2017 Inoue .................. H01M 50/543
429/62

* cited by examiner

*Primary Examiner* — Jue Zhang
(74) *Attorney, Agent, or Firm* — Maier & Maier, PLLC

(57) ABSTRACT

Embodiments of the present application provide a protective device for cell including a first conductive component and a second conductive component that are disposed oppositely and spaced apart. A switching unit disposed between the first conductive component and the second conductive component is configured to disconnect the first conductive component from the second conductive component based on a predetermined temperature of the cell. The purpose of the present application is to provide a protection device for cell to timely cut off the internal circuit of the cell when the internal temperature of the cell is high.

18 Claims, 4 Drawing Sheets

PROTECTIVE DEVICE FOR CELL

CROSS REFERENCE

This application claims priority to and benefits from Chinese Patent Application No. 201821458106.6, filed on Sep. 6, 2018, the entire content of which is incorporated herein by reference.

FIELD

The present application generally relates to the field of battery cell, in particular, to a protective device for battery cell.

BACKGROUND

The internal components of the terminal apparatus may generate heat during the usage, and the cell inside the terminal apparatus also generates heat during charging and discharging process. If there is a large amount of heat accumulation or internal short circuit, the cell will heat up sharply. If the charging and discharging circuit cannot cut off in time, it may cause spontaneous combustion or even explosion easily.

Currently, the common technical solution for this problem relies on external circuits or terminal apparatus for protection. For example, the terminal apparatus is disposed with a temperature sensor, which feeds back the temperature near the cell to CPU of the terminal apparatus for processing, and once the temperature reaches an upper limit, an alarm is issued or the circuit connected to the cell is cut off. However, such technology solution relies on the temperature feedback control of the external circuit or the terminal apparatus, and only the connection between the electrical equipment and the cell can be cut off. While the circuit inside the cell cannot be cut off. If the internal short circuit of the cell causes high temperature, the method mentioned above cannot cut off the internal circuit of the cell itself in time. Therefore, fails to protect the cell directly and effectively.

SUMMARY

For the problems in the related art, the purpose of the present application is to provide a protection device for cell to timely cut off the internal circuit of the cell when the internal temperature of the cell is high.

To achieve the above purpose, the present application provides a protective device for cells. The protective device disclosed includes a first conductive component and a second conductive component that are disposed oppositely and spaced apart; and a switching unit disposed between the first conductive component and the second conductive component. Wherein, the switching unit is in an OFF state when the core temperature of the cell reaches a predetermined temperature.

According to an embodiment of the present application, the protective device further includes an insulating post, and the insulating post supports and connects the first conductive component and the second conductive component.

According to an embodiment of the present application, the switching unit includes a connector of film structure, and the connector of film structure is configured as a conductive element that softens and contracts at the predetermined temperature, so as to disconnect the first conductive component from the second conductive component.

According to an embodiment of the present application, the materials of the connector of film structure include polyethylene, polyester, or a combination thereof.

According to an embodiment of the present application, the structure shapes of the connector of film structure include an arch shape, a zigzag shape, and a square wave shape.

According to an embodiment of the present application, the connector of film structure is a layered structure disposed between the first conductive component and the second conductive component.

According to an embodiment of the present application, the structure of the switching unit includes a layered structure.

According to an embodiment of the present application, the materials of the switching unit include one or more of acrylic, polyethylene, and resin.

According to an embodiment of the present application, the first conductive component is an electrode tab of the cell, and the second conductive component is an electrode sheet of the cell.

According to an embodiment of the present application, the first conductive component is an electrode of an external circuit, and the second conductive component is an electrode tab of the cell.

The beneficial technical effects of the present application are as follows:

In the protective device for cell provided by the present application, a protective device having a switching unit is disposed inside the cell. When the core temperature of the cell remains at a normal temperature, the switching device does not affect the connection of the internal conductive circuit of the cell; while when the core temperature rises to or above a predetermined temperature, the switching unit may disconnect the internal conductive circuit in time. Thus to avoid the excessive reliance on the CPU of the terminal apparatus and enhances the protection of the cell itself.

DETAILED DESCRIPTION

Figure 1:
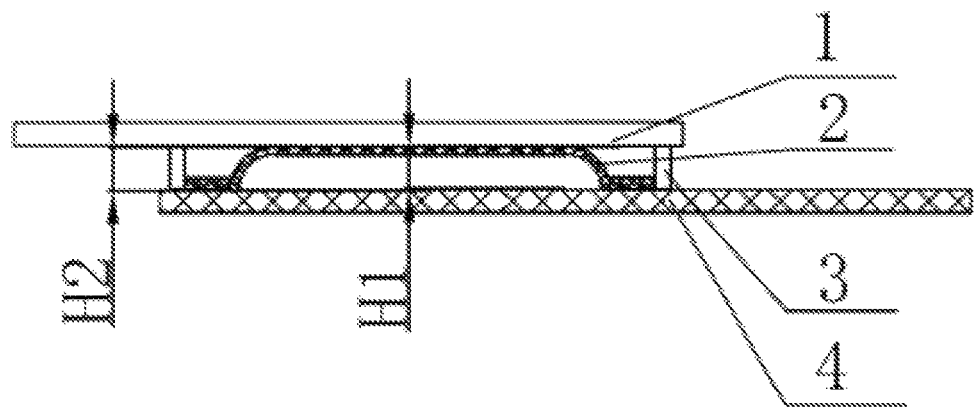
FIG. 1 is a structural schematic of a protective device according to an embodiment of the present application, showing a state of a connector of film structure configured to be arched at a normal temperature.

Descriptions of various embodiments will now be made with reference to the accompanying drawings. It should be understood that the embodiments described in the following description of the present application and the embodiments shown in the drawings are exemplary and are not intended to limit the present application. The various components and features of the present application may be combined with each other to form an embodiment that is not shown in the drawings, which may be in accordance with the particular use.

It should also be noted that the materials and technology for processing materials in the present application do not involve improvements in material composition. And for the convenience of understanding, the normal temperature herein refers to −50° C.~50° C. (excluding 50° C.), and the high temperature refers to 50° C.~200° C. However, in actual case, there may be many definitions for normal temperature, because the definition for normal temperature requires considering various factors, such as the power of the circuit or the cell core in the actual situation. Therefore, the normal temperature and high temperature mentioned below are only illustrative.

As shown in FIG. 1, a protective device for cell is illustrated in an embodiment of the present application. The protective device includes a first conductive component 1, a second conductive component 4 and a switching unit 2. The first conductive component 1 and the second conductive component 4 are disposed opposite each other with a space therebetween. In addition, the switching unit 2 is disposed between the first conductive component 1 and the second conductive component 4. The switching unit is in an Off state when the core temperature of the cell reaches a predetermined temperature, i.e., the switching unit 2 is configured to disconnect the first conductive component 1 and the second conductive component 4 based on a predetermined core temperature of the cell. Therefore, when the core temperature is normal, the switching unit 2 allows the first conductive component 1 to connect with the second conductive component 4, and the internal circuit of the cell is a closed circuit for the cell to operate normally. When the core temperature arises and reaches a predetermined temperature, the switching unit 2 allows the first conductive component 1 to disconnect with the second conductive component 4, whereby the internal circuit of the cell may become an open circuit, so as to protect the cell.

In addition, it should be noted that the structures of the first conductive component 1 and the second conductive component 4 are not limited, and may be in the shape of a sheet or a prism, as long as the shapes thereof help to cooperate with the switching unit 2.

In an embodiment, as shown in FIG. 1, the protective device further includes an insulating post 3. The insulating post 3 may be made of a polymer that is resistant to electrolyte but not conductible, such as PP material. As the material has a long service life, it contributes to the stability of the overall performance of the cell. The insulating post 3 is disposed between the first conductive component 1 and the second conductive component 4 for supporting and connecting the first conductive component 1 and the second conductive component 4, so that a certain gap is maintained between the first conductive component 1 and the second conductive component 4. And the thickness of the gap is equal to the height of the insulating post 3.

Furthermore, in the present embodiment, the insulating post 3 is connected to the first conductive component 1 and the second conductive component 4 in various connection manners. For example, threaded flanges may be disposed at both ends of the insulating post 3, and screw holes matching the flanges are respectively disposed on the first conductive component 1 and the second conductive component 4. Alternatively, cylindrical flanges may also be disposed at both ends of the insulating post 3, and holes having the same diameters and heights as the flange are respectively disposed on the first conductive component 1 and the second conductive component 4. Of course, other optional connecting manners, such as bonding, are also within the scope of the present application. For example, both ends of the insulating post 3 are applied with an electrolyte-resistant glue or tape and then are respectively connected to the first conductive component 1 and the second conductive component 4. Of course, it should be noted that the insulating post 3 is an alternative component. In other words, the insulating post 3 may include only one insulating post unit, or include a plurality of insulating post units, or the insulating post unit may be omitted. The amount of the insulating posts 3 is optimally designed according to parameters, such as the structure, rigidity, hardness, and the like of the first conductive component 1 and the second conductive component 4.

Figure 2:
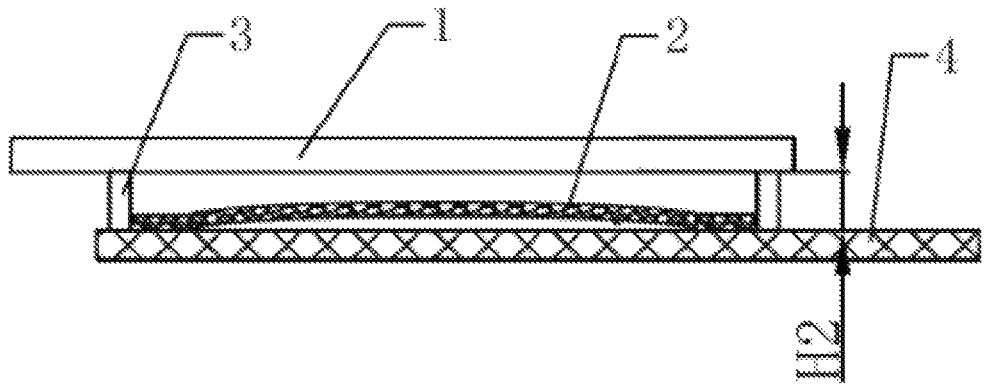
FIG. 2 is a structural schematic of a protective device according to an embodiment of the present application, showing a state of a connector of film structure configured to be arched at a high temperature.

In another embodiment, as shown in FIGS. 1 and 2, the switching unit 2 further includes a connector of film structure. And the connector of film structure is configured as a conductive element that will soften and contract at the predetermined temperature to allow the first conductive component 1 to disconnect with the second conductive component 4. That is, the connector of film structure is configured as an element having at least conductivity and thermoplasticity. The connector of film structure may be connected to the first conductive component 1 or may be connected to the second conductive component 4. In the present embodiment, the connector of film structure is configured as arched film layer with a bulged middle portion, and both ends of the connector of film structure are connected to the second conductive component 4. Further, the thickness of the film layer is smaller than the thickness of the gap between the first conductive component 1 and the second conductive component 4. When the cell is at a normal temperature, the height H1 of the connector of film structure is equal to the height H2 of the insulating post, and the bulged portion is in contact with the first conductive component 1 to form a contact point or a contact surface, whereby the internal circuit of the cell is a closed circuit. When the cell core is at a high temperature, the bulged middle portion of the connector of film structure softens and contracts, and the connector of film structure is separated from the first conductive component 1, whereby the contact point or contact surface disappears, so the internal circuit of the cell is cut off. It is to be further explained that when the cell is at a normal temperature, the bulged portion of the connector of film structure is not in contact with the second conductive component 4, and a cavity is formed between the bulged portion and the second conductive component 4. When the cell core of the cell is at a high temperature, the bulged middle portion in the connector of film structure will soften and contract, then the cavity reduces or even disappears.

In addition, in the present embodiment, the connector of film structure may be connected to the second conductive component 4 in a plurality of ways. For example, the connector of film structure may be welded to the second conductive component 4, may be taped to the second conductive component 4, or may be riveted to the second conductive component by rivets. Of course, other optional connecting manners, such as bonding, are within the scope of the present application. For example, the connector of film structure may be adhered to the second conductive component 4 with glue. It should also be noted that the glue may be selected to resist the corrosion of the electrolyte.

In still another embodiment, the material for the manufacture of the connector of film structure includes polyethylene and polyester materials. This type of material has good thermoplastic properties. In order to realize the conductivity of the material, a conductive medium such as a conductive silver slurry or other medium capable of conducting electricity may be mixed and added into the molten polyethylene or the molten polyester material. It should be further explained that the principle of softening and contract of the connector of film structure is that the temperature the connector of film structure can endure may be controlled by the softening points of the different materials, and the connector of film structure is thermally deformed and contracted at the temperature. Thereby separating the connector of film structure from the first conductive component 1. In the present embodiment, the softening temperature of the connector of film structure is in range of 50~200° C. That is, when the cell core reaches an arbitrary temperature of 50 to 200° C., the connector of film structure is thermally deformed and shrunk. Of course, the softening temperature of the connector of film structure is not limited to be in range of 50 to 200° C., and may be optimized according to factors such as the heat generation of the cell.

Figure 3:
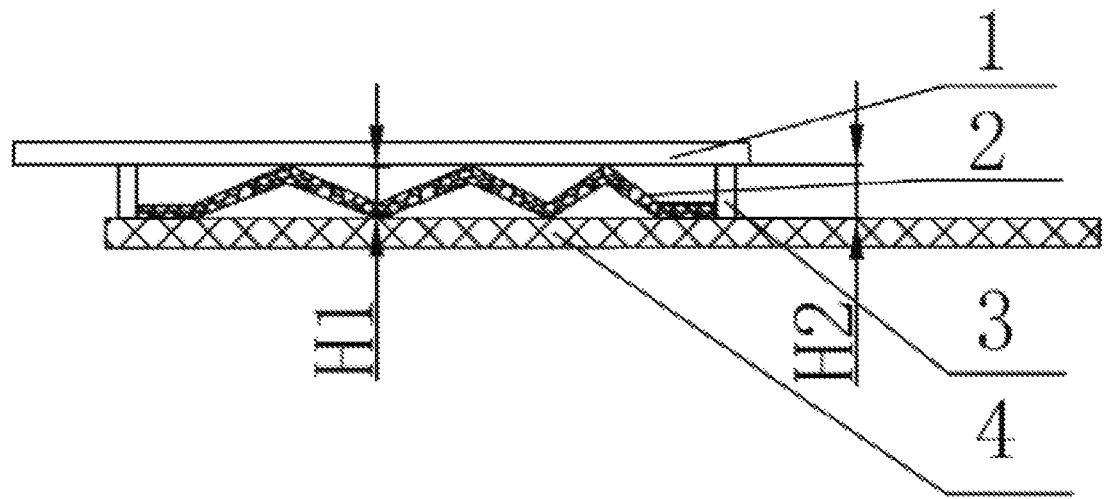
FIG. 3 is a structural schematic of a protective device according to an embodiment of the present application, showing a state of a connector of film structure configured to be a zigzag shape at a normal temperature.
Figure 4:
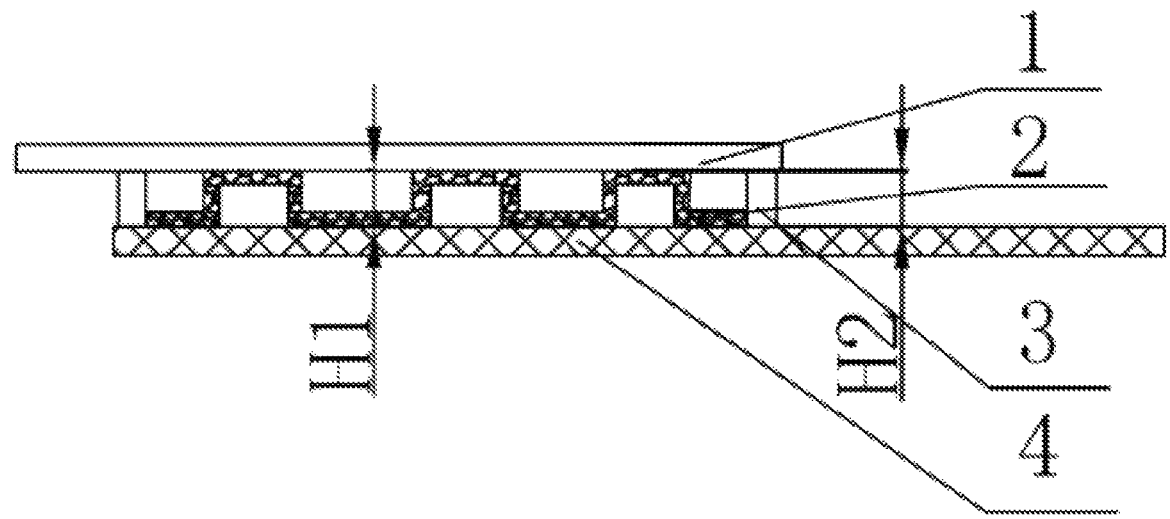
FIG. 4 is a structural schematic of a protective device according to an embodiment of the present application, showing a state of a connector of film structure configured to be a square waveform shape at a normal temperature.

In an embodiment, as shown in FIGS. 1, 3 and 4, the connector of film structure may be arched, zigzag or square-wave shaped. Of course, the structure of the connector of film structure is not limited to these, and may be trapezoidal, triangular, etc.

In the embodiment shown in FIG. 3, the connector of film structure is zigzag shaped, that is, the bulged portion of the connector of film structure is triangular. Both ends of the connector of film structure are respectively connected to the second conductive component 4. Wherein the height H1 of the connector of film structure is equal to the height H2 of the insulating post 3, and the bulged portion of the connector of film structure is in contact with the first conductive component 1 to form a plurality of contact points.

In the embodiment shown in FIG. 4, the connector of film structure is square-wave shaped, that is, the bulged portion of the connector of film structure is in shape of rectangle. Both ends of the connector of film structure are respectively connected to the second conductive component 4. Wherein the height H1 of the connector of film structure is equal to the height H2 of the insulating post 3, and the bulged portion of the connector of film structure is in contact with the first conductive component 1 to form a plurality of contact surfaces.

In addition, in embodiments shown in FIGS. 1, 3 and 4, the connector of film structure may be adhered to the second conductive component 4 by an electrolyte resistant glue.

Figure 5:
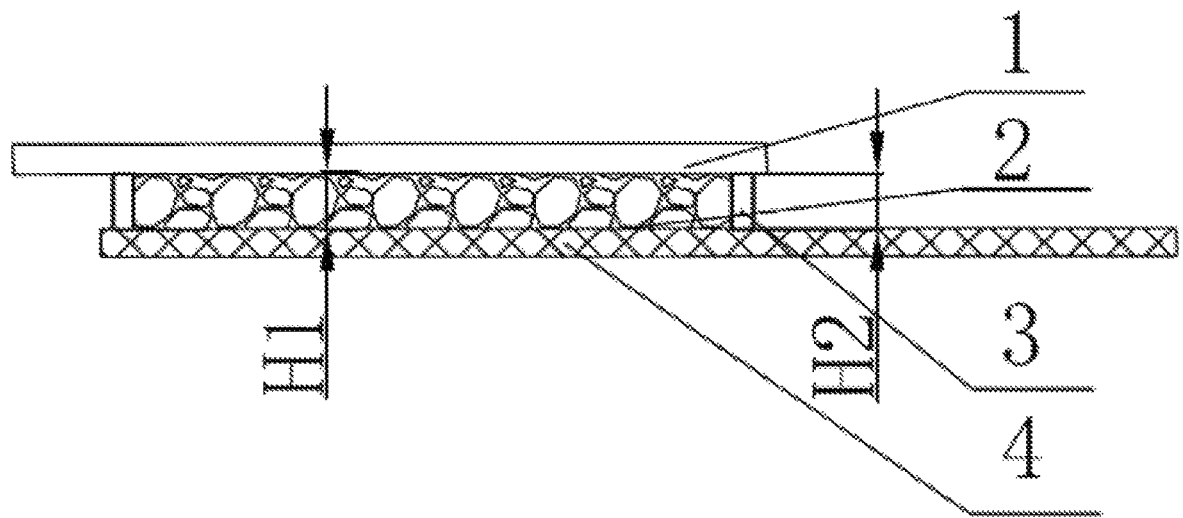
FIG. 5 is a structural schematic of a protective device according to an embodiment of the present application, showing a state of a connector of film structure configured to be a layered structure at a normal temperature.

In a still another embodiment, as shown in FIG. 5, the connector of film structure is a layered structure disposed between the first conductive component 1 and the second conductive component 4. It should be noted that the layered structure is not particularly limited, and may be a plurality of interconnected solid blocks, or may be spherical or cylindrical. In the present embodiment, the layered structure is a plurality of interconnected solid blocks and is connected to the second conductive component 4. Of course, the connecting manner may be bonding by glue resistant to electrolyte corrosion.

When the cell core is at a normal temperature, the entire layer of the connector of film structure bulges, the bulged height H1 of the connector of film structure is equal to the height H2 of the insulating post, and the connector of film structure is in contact with the first conductive component 1 to form a contact surface. When the cell core is at a high temperature and reaches a predetermined temperature, the connector of film structure softens and contracts, and the connector of film structure is separated from the first conductive component 1. Configuring the connector of film structure as a layered structure reduces its own thickness and increases the contact surface, while also increasing the area of the connecting parts to make the connecting parts more tightly.

Figure 6:
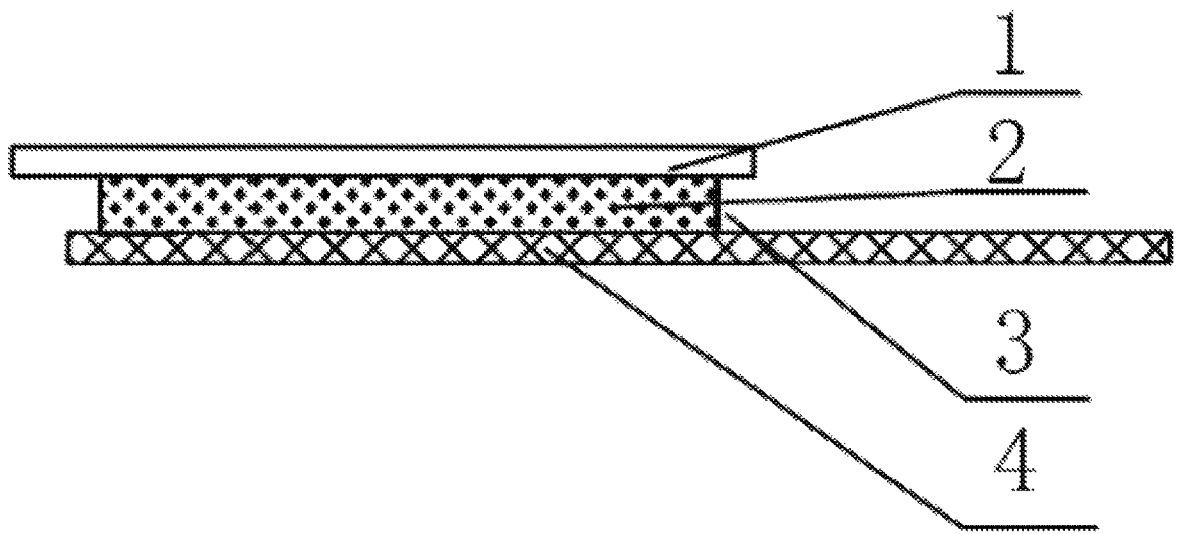
FIG. 6 is a structural schematic of a protective device according to an embodiment of the present application, showing a switching unit including a high temperature loss-conducting material.

In a still another embodiment, as shown in FIG. 6, the switching unit 2 includes a layered structure made of a high-temperature loss-conducting material, which loss its capability of electrode conducting ability in a specific high temperature. In the present embodiment, the layered structure is in a form of solid block, and the layered structure is disposed between the first conductive component 1 and the second conductive component 4. The thickness of the layered structure is equal to the thickness of the gap between the first conductive component 1 and the second conductive component 4. The operative principle of the switching unit 2 is that when the cell core of the cell is at a high temperature, the electric resistance of the layered structure made of the high-temperature loss-conducting material instantaneously becomes large, causing the switching unit to lose its conductivity therefore to disconnect the internal circuit of the cell. It can be understood that the opposite sides of the layered structure are respectively connected to the first conductive component 1 and the second conductive component 4. Of course, the optional connecting manner is bonding by glue resistant to electrolyte corrosion. In addition, it should be noted that the layered structure may also be other structures such as a cylinder, a prism, a sphere, a cone or an arch.

In a still another embodiment, the material of the switching unit 2 includes an acrylic material, a polyethylene material, and a resin material. Of course, the material of the switching unit 2 is not limited thereto, and other materials having the same or similar properties may be used. In the present embodiment, the rubber material in the main material of the switching unit 2 includes acrylic, polyethylene, and resin, and a conductive medium is added into the rubber material. The conductive medium has the characteristic that the medium is a good conductor at normal temperature. While when the temperature rises to a specific high value, the electric resistance of the medium increases instantaneously and loses conductivity thereof. It should be noted that in the present embodiment, the normal temperature ranges from −50° C. to 50° C. (excluding 50° C.), and the high temperature ranges from 50° C. to 200° C. (including 50° C.).

In a still another embodiment, the first conductive component 1 is an electrode tab of the cell, and the second conductive component 4 is an electrode sheet of the cell. In the present embodiment, the protective device is disposed inside the cell to protect the circuit inside the cell.

Figure 7:
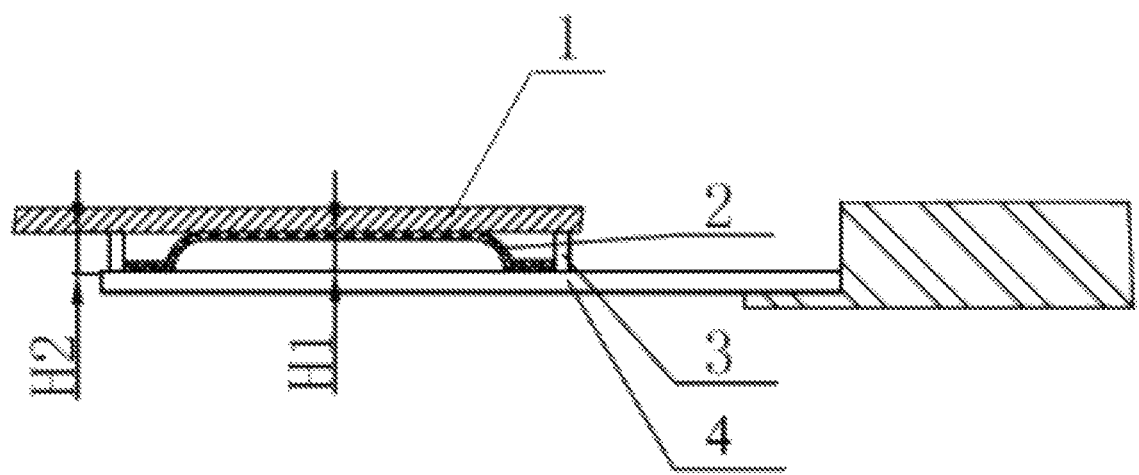
FIG. 7 is a schematic of a protective device applied to an external circuit.

In a still another embodiment, as shown in FIG. 7, the first conductive component 1 may be an electrode of an external circuit, and the second conductive component 4 may be an electrode tab of the cell. In the present embodiment, the protective device is disposed between the cell and an external circuit. When the cell core or external circuit is at a high temperature, the protective device may disconnect the cell from the external circuit in time.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A protective device for a cell, comprising:
   a first conductive component and a second conductive component disposed oppositely and spaced apart; and
   a switching unit disposed between the first conductive component and the second conductive component;
   wherein the switching unit is in an OFF state to disconnect the first conductive component and the second conductive component when a core temperature of the cell reaches a predetermined temperature; and wherein the switching unit comprises a connector of film structure configured as a conductive element that softens and contracts at the predetermined temperature, so as to disconnect the first conductive component from the second conductive component.

2. The protective device according to claim 1, wherein the protective device further comprises an insulating post supporting and connecting the first conductive component and the second conductive component.

3. The protective device according to claim 1, wherein a material of the connector of film structure comprise polyethylene, polyester, or a combination thereof.

4. The protective device according to claim 1, wherein a structure shape of the connector of film structure comprises an arch shape, a zigzag shape, or a square wave shape.

5. The protective device according to claim 1, wherein the connector of film structure is a layered structure disposed between the first conductive component and the second conductive component.

6. The protective device according to claim 1, wherein the structure of the switching unit comprises a layered structure.

7. The protective device according to claim 6, wherein a material of the switching unit comprise one or more of acrylic, polyethylene, and resin.

8. The protective device according to claim 1, wherein the first conductive component is an electrode tab of the cell, and the second conductive component is an electrode sheet of the cell.

9. The protective device according to claim 1, wherein the first conductive component is an electrode of an external circuit, and the second conductive component is an electrode tab of the cell.

10. The protective device according to claim 2, wherein the structure of the switching unit comprises a layered structure.

11. The protective device according to claim 1, wherein at a temperature lower than the predetermined temperature, the connector of film structure has a height H1 equal to a height H2 of the insulating post.

12. The protective device according to claim 11, wherein a bulged portion of the connector of film structure contacts with the first conductive component, to form a contact point or a contact surface.

13. The protective device according to claim 12, wherein the bulged portion is disengaged from the first conductive component when the core temperature of the cell reaches the predetermined temperature.

14. The cell according to claim 13, wherein the first conductive component is an electrode tab of the cell, and the second conductive component is an electrode sheet of the cell.

15. The cell according to claim 13, wherein the first conductive component is an electrode of an external circuit, and the second conductive component is an electrode tab of the cell.

16. A cell, comprising a protective device, wherein the protective device comprises:
   a first conductive component and a second conductive component disposed oppositely and spaced apart; and
   a switching unit disposed between the first conductive component and the second conductive component;
   wherein the switching unit is in an OFF state to disconnect the first conductive component and the second conductive component when a core temperature of the cell reaches a predetermined temperature; and wherein the switching unit comprises a connector of film structure configured as a conductive element that softens and contracts at the predetermined temperature, so as to disconnect the first conductive component from the second conductive component.

17. The cell according to claim 16, wherein the protective device further comprises an insulating post supporting and connecting the first conducive component and the second conductive component.

18. The protective device according to claim 17, wherein a bulged portion of the connector of film structure contacts with the first conductive component, to form a contact point or a contact surface, and the bulged portion is disengaged from the first conductive component when the core temperature of the cell reaches the predetermined temperature.

* * * * *